No. 786,865. PATENTED APR. 11, 1905.
W. A. WASSERMAN.
COMBINED STRAINER AND HOLDER FOR COFFEE POTS.
APPLICATION FILED AUG. 5, 1904.
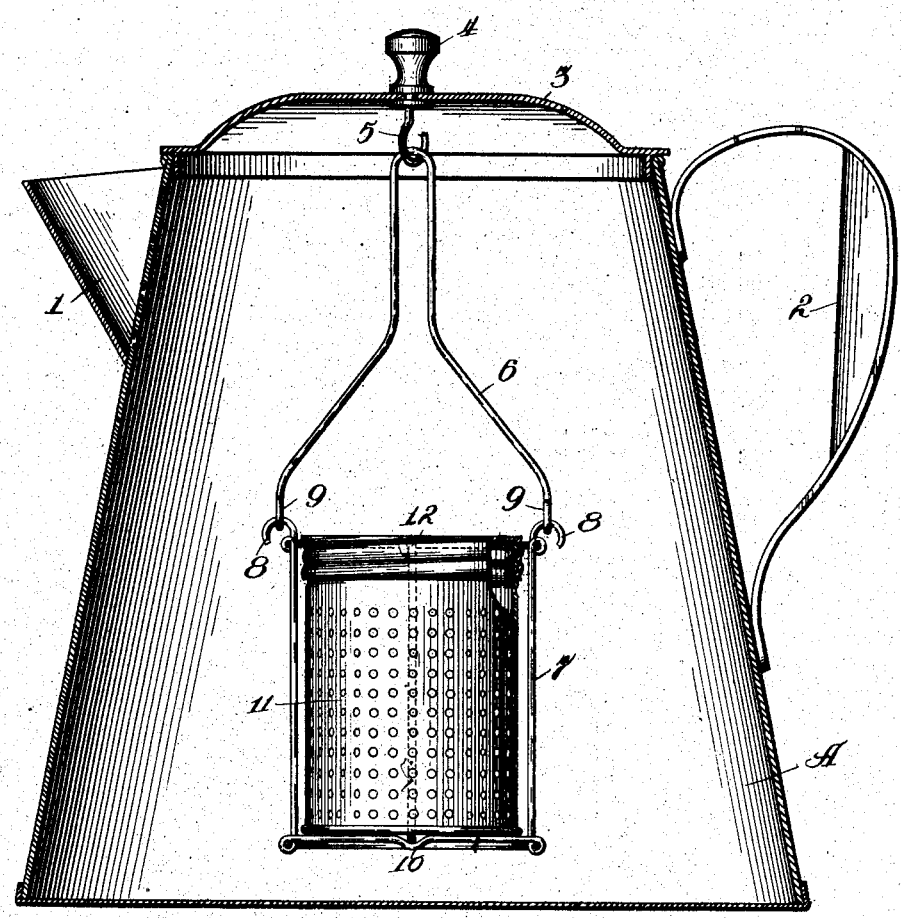

No. 786,865.

Patented April 11, 1905.

UNITED STATES PATENT OFFICE.

WILLIAM A. WASSERMAN, OF BALTIMORE, MARYLAND.

COMBINED STRAINER AND HOLDER FOR COFFEE-POTS.

SPECIFICATION forming part of Letters Patent No. 786,865, dated April 11, 1905.

Application filed August 5, 1904. Serial No. 219,628.

*To all whom it may concern:*

Be it known that I, WILLIAM A. WASSERMAN, a citizen of the United States, residing at Baltimore city, State of Maryland, have invented new and useful Improvements in a Combined Strainer and Holder for Coffee-Pots, of which the following is a specification.

My invention relates to an improvement in holders and strainers for coffee and tea pots, the object being to provide a simple arrangement for suspending the tea or coffee centrally inside of the pot and suspending it from the lid or cover, so that it may be removed with the lid or cover and placed in position with the latter.

With these objects in view my invention consists in certain novel features of construction and combinations of parts, which will be hereinafter described, and pointed out in the claims.

The accompanying drawing is a vertical sectional view through a coffee-pot, showing my improvement suspended from the cover within the pot.

A represents the coffee-pot, having the usual spout 1 and handle 2.

The numeral 3 indicates the cover, which may be held in position frictionally, as customary, and be made detachable, as shown, or it may be in the form of a hinged lid, if preferred. This cover preferably has a knob 4 at the top, by means of which it is manipulated. From this knob a hook 5 depends. Attached to this hook is the wire hanger 6, it being detachably connected with the hook. A wire cage 7 is provided with hooks 8 8, by means of which it is supported in loops or eyes 9 9 at the lower end of the hanger. The wire cage may be variously constructed and preferably consist of the upright, cross, and circular wires, as illustrated, forming a bottom at the lower end, as at 10, and open at the upper end. In this cage a strainer 11 is held. This comprises a small cylindrical sheet-metal box with a removable screw-cap 12 at the top. Both the box and the screw-cap are preferably perforated, as illustrated in the drawing. Within this strainer the ground coffee or tea, as the case may be, is placed, after which the cap is screwed on. The whole is then dropped into the cage, and the cage is submerged in the water in the pot as the cover is placed thereon. In this way I provide a very simple and inexpensive device for holding a measured quantity of coffee or tea, which works most satisfactorily in obtaining the full extract, while at the same time straining it before it leaves the pot.

Slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. The combination with the cover of a coffee or tea pot and a hanger suspended therefrom, of a cage suspended from the hanger and an open-work receptacle adapted to contain coffee or tea removably received in the cage.

2. The combination with the cover of a coffee or tea pot, and a hanger detachably connected with the cover, of a wire cage detachably suspended from the hanger and an open-work receptacle removably secured in the cage.

3. The combination with a coffee or tea pot provided with a cover, of a hanger suspended from the cover, a skeleton cage pivotally secured to the hanger, the cage being open at the top and a foraminated receptacle received within and supported by the cage, the receptacle provided with a removable cover, and resting on the bottom of the cage.

In testimony whereof I affix my signature in presence of two subscribing witnesses.

WILLIAM A. WASSERMAN.

Witnesses:
EMIL R. DENHARD,
E. WALTON BREWINGTON.